United States Patent Office 3,824,234
Patented July 16, 1974

3,824,234
7,8,9,10-TETRAHYDRO - 2 - METHOXY-7-MORPHO-LINOMETHYLCYCLOHEPT[b]INDOL-6(5H)-ONE
Joseph William Epstein, Monroe, and Leon Goldman, Nanuet, N.Y., assignors to American Cyanamid Company, Stamford, Conn.
No Drawing. Filed Mar. 24, 1972, Ser. No. 237,937
Int. Cl. C07d 87/40
U.S. Cl. 260—247.5 R     1 Claim

ABSTRACT OF THE DISCLOSURE

This disclosure describes compounds of the class of substituted tetrahydrocyclohept[b]indol-6(5H)-ones useful as antifungal and analgetic agents.

BRIEF SUMMARY OF THE INVENTION

This invention relates to new organic compounds and, more particularly, is concerned with novel substituted tetrahydrocyclohept[b]indol-6(5H)-ones which may be represented by the following structural formuale:

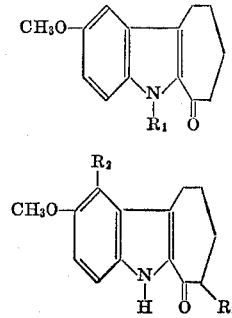

wherein $R_1$ is methyl or $\beta$-pyrrolidinoethyl, $R_2$ is hydrogen or formyl, and $R_3$ is hydrogen, hydroxymethylene or morpholinomethyl, with the proviso that $R_2$ and $R_3$ cannot both be hydrogen.

DETAILED DESCRIPTION OF THE INVENTION

The novel compounds of the present invention when $R_1$ is $\beta$-pyrrolidinoethyl and $R_3$ is morpholinomethyl form useful pharmaceutically acceptable acid-addition salts with a variety of non-toxic organic and inorganic salt-forming reagents. Thus, acid-addition salts, formed by admixture of the organic free base with an equivalent of an acid in a suitable solvent, are formed with such acids as acetic, ascorbic, citric, gluconic, hydrochloric, hydrobromic, lactic, sulfuric, phosphoric, tartaric and the like. For purposes of this invention, these organic free bases are equivalent to their non-toxic acid-addition salts.

The novel compounds of the present invention are generally obtainable as colorless to yellow crystalline materials having characteristic melting points and absorption spectra and which may be purified by recrystallization from common organic solvents. They are appreciably soluble in many organic solvents such as methanol, ethanol, acetone, chloroform, benzene, dioxane, dimethyl sulfoxide and N,N-dimethylformamide, but are relatively insoluble in water. The acid-addition salts of the above-defined free bases of this invention are, in general, crystalline solids relatively soluble in water, methanol and ethanol but relatively insoluble in non-polar organic solvents such as diethyl ether, benzene, toluene, and the like.

The novel compounds of the present invention are useful as antifungal agents, and possess activity *in vitro* against fungal cultures capable of causing disease in man or animals. This activity, against a variety of standard laboratory microorganisms, is determined by the agar-dilution technique. In this assay, the compound to be tested is dissolved in dimethyl sulfoxide so that 10.0 mg. of test compound is contained per milliliter of solution. Observing sterile techniques, ten-fold serial dilutions are made of the test solution. Two-tenths ml., 0.1 ml. and 0.05 ml. amounts of the original solution and of each of the decimal dilutions are then added to and mixed with 20 ml. of warm sterile asparagine-meat extract agar capable of supporting growth of the test cultures. The standard sterile nutrient agar solutions containing the different dilutions of the test compound, along with suitable and comparable control dilutions containing no test compound, are then allowed to cool in Petri dishes thereby forming solid agar plates. The yeast-like test fungi are prepared for use by growing in Trypticase Soy broth overnight. These broth cultures are diluted tenfold in physiological saline at the time of use. The filamentous fungi are grown to maturity on slants of potato dextrose agar. Spores and mycelia are harvested by washing the growth from the slants with sterile physiological saline solution. Using the Steers Replicator a standardized amount of each of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of growth is noted. The minimal inhibitory concentration (mcg./ml.) is defined as the concentration of test compound causing essentially complete inhibition of any particular organism. In a representative operation, the minimal inhibitory concentration of the compounds of this invention against standard laboratory microorganisms, as determined in the above-described assay, are set forth in Table I, below.

TABLE I

| Compound | Minimal inhibitory conc. (mcg./ml.) | | | | |
|---|---|---|---|---|---|
| | (1) | (2) | (3) | (4) | (5) |
| Fungal cultures: | | | | | |
| *Candida albicans* E 83 | | | | | |
| *Cryptococcus neoformans* E 138 | | 250 | | 250 | |
| *Microsporum canis* ATCC 10214 | 2.5 | 0.5 | 10 | 250 | 10 |
| *Microsporum gypseum* ATCC 14683 | | 2.5 | 25 | 250 | 25 |
| *Phialophthora jeanselmei* E 16 | | | | 250 | |
| *Trichophyton tonsurans* NIH 662 | | 1 | 25 | 250 | 10 |
| *Trichophyton mentagrophytes* E 11 | | 2.5 | 10 | 250 | 25 |
| *Trichophyton rubrum* E 97 | | 2.5 | 25 | 250 | 25 |

[1] 5,6,7,8,9,10-hexahydro-2-methoxy-6-oxocyclohept[b]indole-1-carboxaldehyde.
[2] 7,8,9,10-tetrahydro-2-methoxy-7-morpholinomethylcyclohept[b]indol-6(5H)-one.
[3] 7,8,9,10-tetrahydro-2-methoxy-5-methylcyclohept[b]indol-6(5H)-one.
[4] 7,8,9,10-tetrahydro-2-methoxy-5-[2-(1-pyrrolidinyl)ethyl]cyclohept[b]indol-6(5H)-one.
[5] 7,8,9,10-tetrahydro-7-(hydroxymethylene)-2-methoxycyclohept[b]indol-6(5H)-one.

Certain of the novel compounds of the present invention are active analgetics when measured by the "writhing syndrome" test for analgetic activity as described by Siegmund et al., *Proc. Soc. Exptl. Biol. Med.,* Vol. 9, p. 729 (1957), with modifications. This method is based upon the reduction of the number of writhes following the intraperitoneal injection of one mg./kg. of body weight of phenyl-*p*-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-*p*-quinone. The test compound is administered orally to groups of two mice each 30 minutes before injection of the phenyl -*p*-quinone. The total number of writhes exhibited by each group of mice is recorded for a 3 minute period commencing 15 minutes after injection of the phenyl-*p*-quinone. A compound is considered active if it reduces the total number of writhes in two test mice from a control value of approximately 30 per pair to a value of 18 or less. In a representative operation, the compounds of Table II, below, showed analgetic activity when tested by this procedure at the oral doses indicated in Table II, below.

TABLE II

| Compound | Dose (mg./kg.) of body weight | Number of writhes Pair No. 1 | Pair No. 2 |
|---|---|---|---|
| 7,8,9,10-tetrahydro-2-methoxy-7-morpholinomethylcyclohept[b]indol-6(5H)-one | 100 | 13 | 16 |
| 7,8,9,10-tetrahydro-2-methoxy-5-[2-(1-pyrrolidinyl)ethyl]cyclohept[b]indol-6(5H)-one | 200 | 5 | 9 |

When mixed with suitable excipients or diluents, the compounds of this invention can be prepared as pills, capsules, tablets, powders, solutions, suspensions, and the like for unit dosage and to simplify administration.

This invention will be described in greater detail in conjunction with the following specific examples.

EXAMPLE 1

Preparation of 1,2-cycloheptanedione (p-methoxyphenyl)hydrazone

To a mixture of 47.6 g. of p-anisidine in 180 ml. of water containing 36 ml. of concentrated sulfuric acid and 350 g. of ice is added 26 g. of sodium nitrite in 100 ml. of water followed by a concentrated aqueous solution of 100 g. of sodium acetate. To the vigorously stirred mixture is added 40.0 g. fo 2-hydroxymethylenecycloheptanone over a 5 minute period and stirring is continued for an additional ½ hour. A dark oil separates which then crystallizes. The orange-brown solid is removed by filtration, washed with water and then air dried. The yield of crude product is 59.0 g., m.p. 59° C.–61° C. Recrystallization from ethanol gives 50.9 g. of 1,2-cycloheptanedione (p-methoxyphenyl)hydrazone as orange prisms, m.p. 62° C.–64° C.

EXAMPLE 2

Preparation of 7,8,9,10-tetrahydro-2-methoxycyclohept[b]indol-6-(5H)-one

A solution of 100 g. of 1,2-cycloheptanedione (p-methoxyphenyl)hydrazone in 375 ml. of acetic acid containing 40 ml. of concentrated hydrochloric acid is heated on a steam bath for 1 hour. The black solution is cooled and then is filtered to yield 38.0 g. of black crystals. The filtrate is then diluted with water to yield an additional 20.4 g. of tarry black solid. The crude product is dissolved in 250 ml. of tetrahydrofuran and filtration of the solution through magnesium silicate, followed by evaporation of the filtrate under reduced pressure, gives 43.0 g. of olive green crystals, m.p. 179° C.–181° C. Recrystallization from ethanol/chloroform gives 35.4 g. of 7,8,9,10 - tetrahydro - 2 - methoxycyclohept[b]indol-6(5H)-one as pale yellow needles, m.p. 182° C.–184° C.

EXAMPLE 3

Preparation of 5,6,7,8,9,10-hexahydro-2-methoxy-6-oxocyclohept[b]indole-1-carboxaldehyde To the red solution of 9.16 g. of 7,8,9,10-tetrahydro-2-methoxycyclohept[b]indol-6(5H)-one in 50 ml. of trifluoroacetic acid is added 4.16 g. of s-triazine over a 2 hour period. The solution is diluted with 250 ml. of water and is made basic with ammonium hydroxide. The yellow precipitate that forms is dissolved in dichloromethane and the solution is dried over magnesium sulfate. The solution is filtered through magnesium silicate and evaporation of the filtrate gives 5.01 g. of yellow crystals, m.p. 187° C.–192° C. Recrystallization from ethanol/chloroform gives 3.15 g. of 5,6,7,8,9,10-hexahydro-2-methoxy-6-oxocyclohept[b]indole-1-carboxaldehyde as yellow needles, m.p. 195° C.–197° C.

EXAMPLE 4

Preparation of 7,8,9,10-tetrahydro-2-methoxy-7-morpholinomethylcyclohept[b]indol-6(5H)-one A solution of 11.45 g. of 7,8,9,10-tetrahydro-2-methoxycyclohept[b]indol-6(5H)-one, 6.50 g. of morpholine hydrochloride and 5.0 g. of paraformaldehyde in 150 ml. of ethanol is refluxed for 2 hours. After 16 hours at room temperature the precipitate which forms is collected by filtration and washed with methanol to yield 7.85 g. of pale green powder. This material is dissolved in 500 ml. of hot water and the solution is filtered and is then made basic with concentrated ammonium hydroxide. The precipitate which forms is collected by filtration and washed with water. The precipitate is air-dried and then dried under reduced pressure over phosphorous pentoxide to yield 6.00 g. of pale yellow powder, m.p. 158° C.–160° C. (sinters at 155° C.). The product is recrystallized from ethyl acetate to yield 4.00 g. of 7,8,9,10 - tetrahydro-2-methoxy-7-morpholinomethylcyclohept-[b]indol-6(5H)-one as yellow crystals, m.p. 175° C.–176° C. (insert at 160° C.).

EXAMPLE 5

Preparation of 5,6,7,8,9,10-hexahydro-2-methoxy-5-methylcyclohept[b]indole

To a stirred suspension of 3.0 g. of 54% sodium hydride-mineral oil dispersion in 15 ml. of N,N-dimethylformamide is added 10.70 g. of 5,6,7,8,9,10-hexahydro-2-methoxycyclohept[b]indole in 20 ml. of N,N-dimethylformamide at such a rate as not to cause excessive effervescence. The mixture is stirred for 1 hour and then 8.0 g. of methyl iodide in 10 ml. of N,N-dimethylformamide is added over a ½ hour period, and then stirring is continued for an additional 1 hour. The reaction mixture is poured into 250 ml. of water and a brown crystalline mass forms. The crystals are removed by filtration and dissolved in dichloromethane and the solution is washed with water. The solution is then evaporated under reduced pressure to yield an oil which is dissolved in hexane and this solution is dried over sodium sulfate. The yellow solution is filtered through magnesium silicate, the adsorbant is washed with hexane, then ether, and finally with dichloromethane. Evaporation of the combined filtrates gives 9.85 g. of pale yellow crystals, m.p. 59° C.–62° C. A sample of the product, on sublimation at 105° C. (0.014 mm.), gives 5,6,7,8,9,10-hexahydro - 2 - methoxy-5-methylcyclohept[b]indole as colorless crystals, m.p. 61.5° C.–62.5° C.

EXAMPLE 6

Preparation of 7,8,9,10-tetrahydro-2-methoxy-5-methylcyclohept[b]indol-6(5H)-one To 50 ml. of N,N-dimethylformamide, cooled to 0° C., is added 3.9 ml. of phosphorus oxychloride and the solution is stirred for 15 minutes in an ice bath. A solution of 5.00 g. of 5,6,7,8,9,10-hexahydro-2-methoxy-5-methylcyclohept[b]indole in 30 ml. of N,N-dimethylformamide is then added, followed by 3.7 ml. of diisopropylethylamine, and the resulting dark orange solution is stirred at 0° C. for 15 minutes and then is heated on a steam bath for 15 minutes. The solution is allowed to stand at room temperature for 1 hour and then 500 ml. of water is added and the solution is made basic with concentrated ammonium hydroxide. The solid that precipitates is collected by filtration and is dissolved in dichloromethane and this solution is dried over magnesium sulfate. Evaporation of the solution under reduced pressure gives 5.50 g. of brown oil which is subjected to chromatography on a 2" x 9" magnesium silicate column, eluting with hexane-ethyl acetate (9:1). Thirteen 50 ml. cuts are collected and then the column is eluated with 500 ml. of dichloromethane. Cuts 9–13 are combined with the dichloromethane eluate and evaporation of the solution gives 2.23 g. of amber oil. Partition chromatography on 880 g. of diatomaceous earth using a heptane/2-methoxyethanol system, followed by evaporation of the eluate from the second HBV, gives 0.571 g. of colorless crystals. Recrystallization from hexane gives 0.411 g. of 7,8,9,10-tetrahydro-2-methoxy-5-methylcyclohept[b]indol-6(5H)-one as pale yellow plates, m.p. 86.5° C.–87.5° C.

EXAMPLE 7

Preparation of 7,8,9,10-tetrahydro-2-methoxy-5-methylcyclohept[b]indol-6(5H)-one To a mixture of 0.314 g. of 7,8,9,10-tetrahydro-2-methoxycyclohept[b]indol-6(5H)-one in 1.5 ml. of acetone containing 0.3 ml. of dimethyl sulfate is added a solution of 0.300 g. of sodium hydroxide in 0.25 ml. of water and the mixture is shaken for 3 minutes. The mixture is then poured into water to yield a crystalline mass. The crystals are removed by filtration, washed with water and air dried to yield 0.307 g. of brown crystals, m.p. 85° C.–87° C. Recrystallization from hexane/acetone gives 7,8,9,10-tetrahydro-2-methoxy - 5 - methylcyclohept[b]indol-6(5H)-one as pale yellow plates, m.p. 87° C.–88° C.

EXAMPLE 8

Preparation of 7,8,9,10-tetrahydro-2-methoxy-5-[2-(1-pyrrolidinyl)ethyl]cyclohept[b]indol-6(5H)-one To a stirred solution of 11.47 g. of 7,8,9,10-tetrahydro-2-methoxycyclohept[b]indol-6(5H)-one in 100 ml. of N,N-dimethylformamide at room temperature is added 3.0 g. of 54% sodium hydride/mineral oil dispersion at such a rate as not to cause excessive effervescence. When the evolution of hydrogen ceases 6.68 g. of N-($\beta$-chloroethyl)pyrrolidine in 10 ml. of N,N-dimethylformamide is added in one portion. After stirring for 1 hour, 15.0 g. of N-($\beta$-chloroethyl)pyrrolidine is added and stirring is continued for 24 hours at room temperature. The solution is poured into 500 ml. of water and the aqueous phase is separated from the resultant solid mass by decantation. The solid is dissolved in dichloromethane and the solution is dried over sodium sulfate and filtered through magnesium silicate. Evaporation of this solution under reduced pressure gives 12.50 g. of an amber oil. The oil is dissolved in hexane and the solution is filtered and concentrated until crystals begin to deposit. The mixture is then cooled and filtered to yield 8.98 g. of yellow crystals, m.p. 71.5° C.–73.5° C. Recrystallization from hexane gives 7.54 g. of 7,8,9,10-tetrahydro - 2 - methoxy-5[2-(1-pyrrolidinyl)ethyl]cyclohept[b]indol-6(5H)-one as yellow crystals, m.p. 71.5° C.–73.5° C.

EXAMPLE 9

Preparation of 7,8,9,10-tetrahydro-7-(hydroxymethylene)-2-methoxycyclohept[b]indol-6(5H)-one To a stirred suspension of 2.0 g. of sodium methoxide in 50 ml. of dioxane at room temperature is added 2.29 g. of powdered 7,8,9,10-tetrahydro-2-methoxycyclohept-[b]indol-6(5H)-one. When all solids have dissolved, 2.8 ml. of ethyl formate is added to the yellow solution in one portion and stirring is continued for 1½ hours, at which time the reaction mixture is poured into 500 ml. of water. Upon acidification with acetic acid a yellow precipitate forms which is collected by filtration, washed with water and air-dried to yield 2.45 g. of bright yellow microcrystals, m.p. 157° C.–159° C. Recrystallization from methanol/chloroform gives 1.95 g. of 7,8,9,10-tetrahydro-7-(hydroxymethylene) - 2 - methoxycyclohept[b]indol-6(5H)-one as yellow crystals, m.p. 159° C.– 161° C.

We claim:
1. A compound selected from the group consisting of 7,8,9,10-tetrahydro - 2 - methoxy-7-morpholinomethylcyclohept[b]indol-6(5H)-one and the non-toxic pharmaceutically acceptable acid-addition salts thereof.

References Cited

Indian J. of Chem. 7:319–322 (1969), Nagarajan et al.
Indian J. Pharm. 27:195-7 (1965), Gulati et al.

HENRY R. JILES, Primary Examiner

S. D. WINTERS, Assistant Examiner

U.S. Cl. X.R.

260—326.5 B, 566 B; 424—248, 274